Oct. 8, 1946.  J. M. HAIT  2,408,928
AMPHIBIAN STEERING MECHANISM
Filed Feb. 15, 1943   2 Sheets-Sheet 2
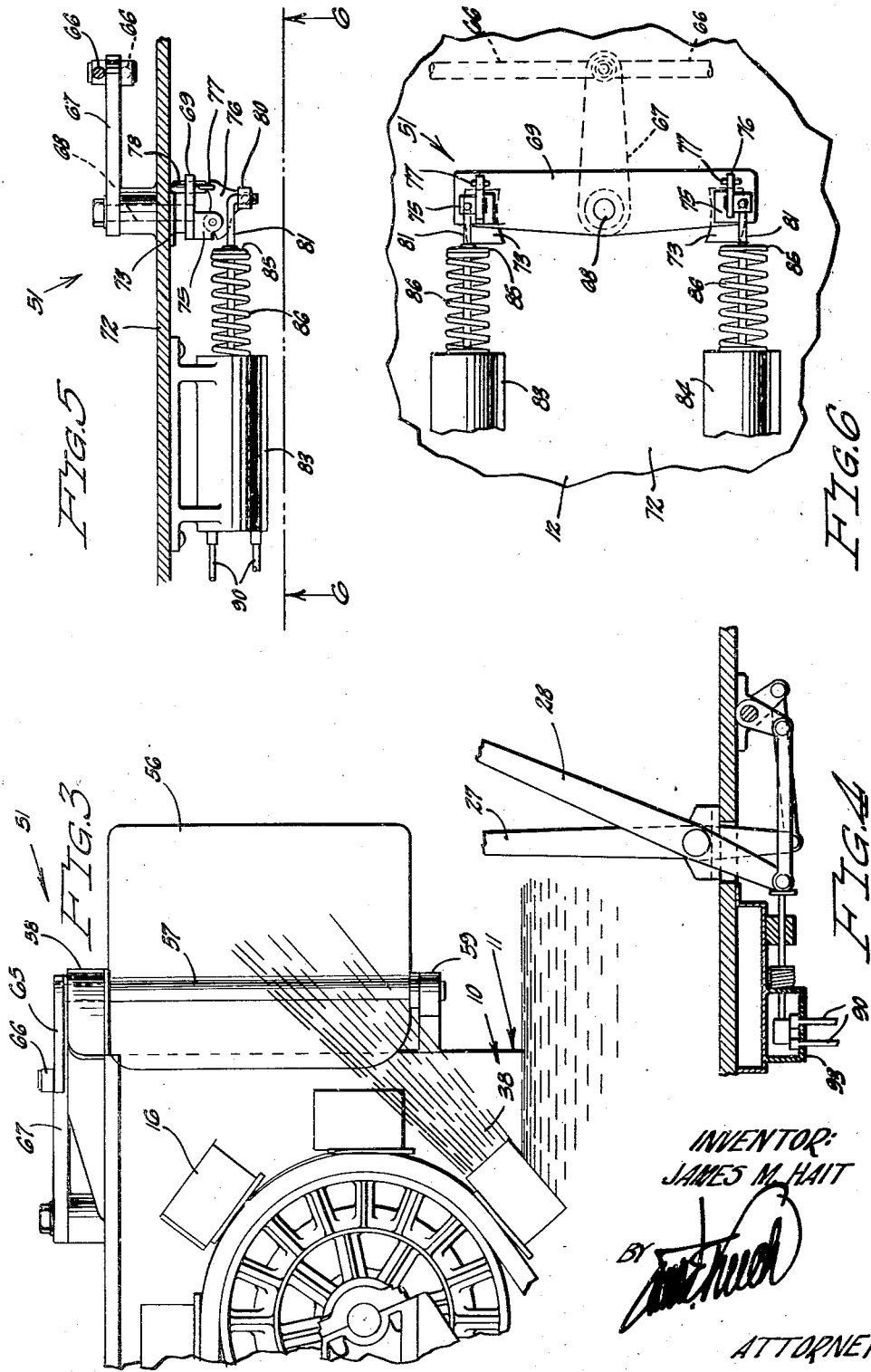
INVENTOR:
JAMES M. HAIT
BY
ATTORNEY Patented Oct. 8, 1946

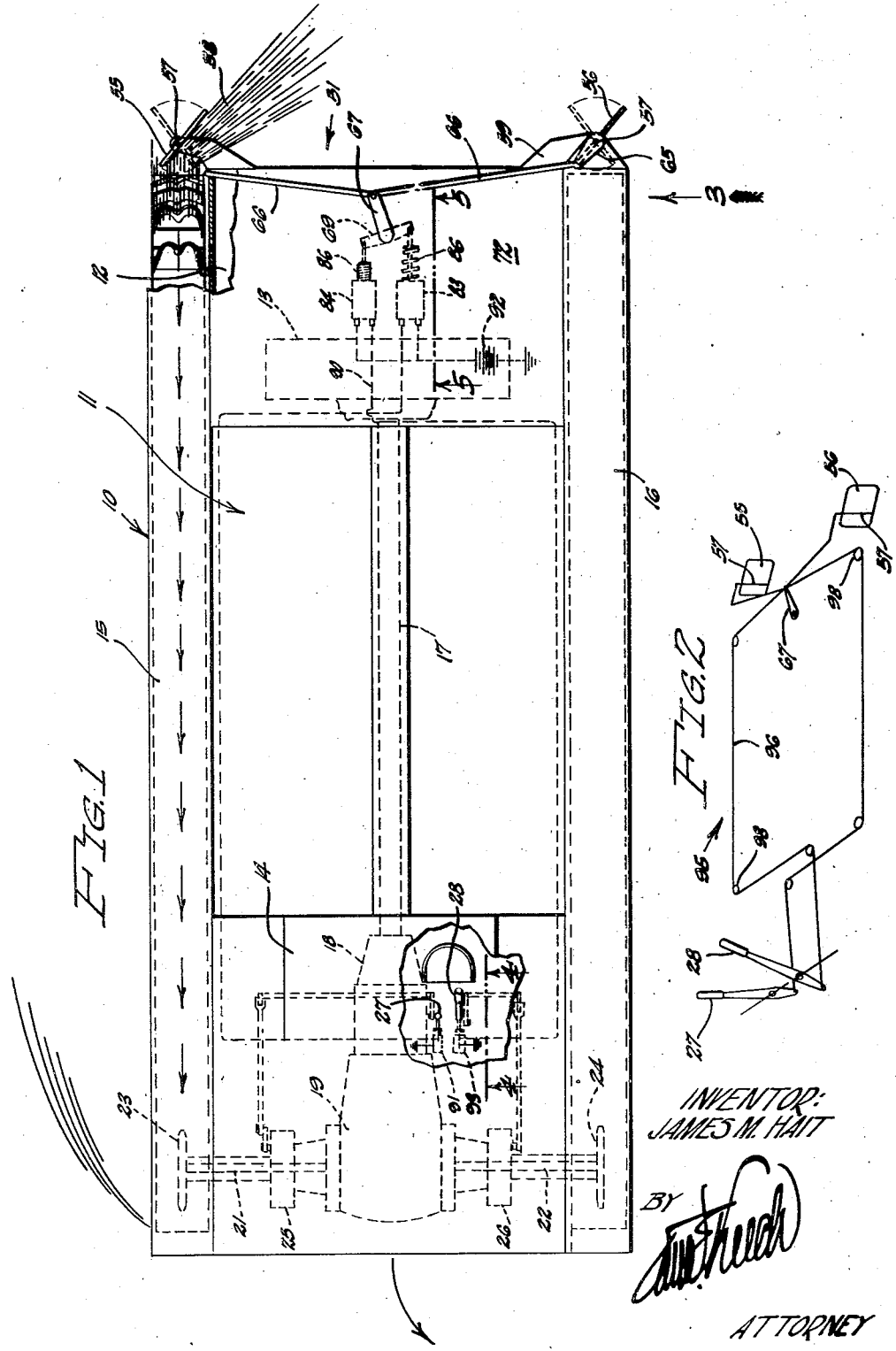

2,408,928

UNITED STATES PATENT OFFICE 2,408,928

AMPHIBIAN STEERING MECHANISM

James M. Hait, San Gabriel, Calif., assignor to Food Machinery Corporation, San Jose, Calif., a corporation of Delaware Application February 15, 1943, Serial No. 475,936

6 Claims. (Cl. 115—1)

This invention relates to the art of steering water craft, and is especially useful on amphibians employed in naval warfare.

It is an object of the invention to provide a relatively simple means for rendering an amphibian of this type readily dirigible in water.

Much of the traveling of these amphibians in the water is at a low speed, yet it is desirable that these craft have a relatively high degree of maneuverability in the water, regardless of their speeds.

It is accordingly another object of my invention to provide a steering mechanism for amphibians which is not dependent upon the forward speed of the amphibian through the water for steering the latter.

An amphibian in current use of the type mentioned is operated by means of track-laying traction belts disposed on opposite sides of the craft, which are adapted to be selectively driven by the power plant to maneuver the craft on land and assist in maneuvering it on water.

It is an object of my invention to provide a mechanism for rendering amphibians readily dirigible, which is operated by the same control devices through which the traction belts on the amphibian are selectively controlled and without the necessity of special thought being given to the steering mechanism.

The manner of accomplishing the foregoing objects, as well as further objects and advantages, will be made manifest in the following description taken in connection with the accompanying drawings, in which:

Fig. 1 is a diagrammatic plan view of an amphibian equipped with a preferred embodiment of the present invention, said amphibian being shown when said invention is functioning to assist said amphibian in turnng to the left.

Fig. 2 is a diagrammatic view illustrating a modified form of the control mechanism for my invention.

Fig. 3 is an enlarged side elevational view taken in the direction of the arrow 3 in Fig. 1, and illustrating the left-hand deflector of said invention.

Fig. 4 is an enlarged fragmentary vertical sectional view taken on the line 4—4 of Fig. 1, and illustrating electrical control switches of said invention.

Fig. 5 is an enlarged detail vertical sectional view taken on the line 5—5 of Fig. 1.

Fig. 6 is a bottom plan view taken on the line 6—6 of Fig. 5.

Referring specifically to the drawings, the amphibian 10 shown therein has a hull 11 embodying an engine compartment 12, in which a radial engine 13 is housed, and a control cabin 14 located at the front end of the craft. Disposed along opposite sides of the hull are track-laying mechanisms 15 and 16, these being driven by the engine 13 through a drive shaft 17, transmission 18, differential 19, shafts 21 and 22, and sprockets 23 and 24. Shafts 21 and 22 are provided with brakes 25 and 26 which are controlled respectively by end levers 27 and 28 provided in the control cabin 14. Thus, pulling on the lever 27 applies the brake 25 to retard the operation of the track-laying mechanism 15 and to cause mechanism 16 to operate with increased speed. On the other hand, releasing lever 27 and pulling on lever 28 has the opposite effect.

The amphibian 10 is equipped with a steering mechanism 51. The latter includes a pair of deflector blades 55 and 56 which are identical and are mounted on pintles 57 extended through upper and lower brackets 58 and 59 provided on the hull 11. As may be seen in Figs. 1 and 3, the blades 55 and 56 are balanced. That is, a portion of each extends forwardly from its pintle 57 so as to balance these blades while they are being turned in the streams of water 38 expelled rearwardly from the traction mechanisms 15 and 16. The upper ends of the pintles 57 are provided with arms 65 which are connected by links 66 to the rear end of an arm 67 mounted on a control shaft 68, on the lower end of which is fixed a lever 69.

The arms 65, links 66 and arm 67 may be above a deck plate 72 of the hull 11, whereas the lever 69 may preferably be below this deck plate.

Provided on the under surface of the deck plate 72 are locking blocks 73. Mounted on the lower faces of opposite ends of the lever 69 are bifurcated brackets 75, in which are pivoted rockers 76, a forward portion of each of which is connected by a link 77 to a lug 78, which extends upwardly towards the adjacent block 73. The lower portion of each rocker 76 has a pivot eye 80 having a vertical aperture which receives the down-turned end of a rod 81 extending towards the lever 69 from one of a pair of solenoids 83 and 84. Each of the rods 81 is provided with a washer 85 fixed thereon and an expansion spring 86. The wiring system 90 connects the solenoid 83 to a switch 91 which is operated to energize the solenoid 83 from a suitable source of electricity such as a battery 92, whenever this lever is pulled back to apply the brake 25. This wiring system also connects the solenoid 84 to a switch 93 which is actuated when the lever 28 is pulled back to apply the brake 26.

During the normal operation of the amphibian 10 only one of the solenoids 83 and 84 will be energized at a time, and if they should be both energized concurrently it will only be at infrequent intervals and for very limited periods.

The operation of the steering mechanism 51 of my invention is well illustrated in Fig. 1, where the amphibian 10 which is equipped with it is shown as being steered to the left. This has been effected by pulling on the lever 28 which applies the brake 26, retards the operation of the left-hand traction mechanism 16, accelerates the rate of operation of the right-hand traction mechanism 15, and energizes the solenoid 84 which pulls upon its rod 81. The result of the last mentioned action is to draw the locking pin 78, controlled by this rod, downwardly, thus releasing that end of the lever 69 permitting the solenoid 84 to pull this lever towards it, thereby swinging the arm 67 as shown in Fig. 1, and turning the deflector blades 55 and 56 as shown. Only one of the streams 38 is still flowing in full force, and this is the one coming from the traction mechanism 15. This engages the blade 55 turned at an angle thereacross, so as to set up a substantial side thrust against the hull 11, which, added to the unbalanced forward thrust of mechanism 15, causes the rapid turning of the amphibian 10 to the left.

It is to be noted that when the lever 28 is released, the compressed spring 86 of the solenoid 84 will restore the lever 69 to its straight-across position as shown in Fig. 6, and this lever will be retained in this position by engagement of the two locking lugs 78 with the rear edge of the locking blocks 73. These lugs will thus retain the deflector blades 55 and 56 in fore and aft alignment with the direction of the water streams 38, so as to interpose a minimum of resistance to these streams when the amphibian 10 is traveling in a straight path. Turning the amphibian 10 to the right is effected by pulling on the lever 27, which energizes the solenoid 83 to produce exactly the reverse operation of the mechanism 51 than that just described when turning to the left.

From the foregoing description it will be seen that no special attention need to be paid during the operation of the amphibian 10 to the steering mechanism of my invention, in order to cause the latter to function to assist in turning the craft each time that one of the levers 27 or 28 is actuated to slow down one of the track-laying mechanisms 15 and 16 and accelerate the rate of travel of the other.

Although I have illustrated my invention in connection with an amphibian 10 in which the upper flights of the track-laying belts are disposed above the surface of the water in which the amphibian is afloat, it is to be understood that my invention may also be incorporated with amphibians in which all of the track-laying belts are submerged. This would also submerge the deflectors 55 and 56. Although these deflectors would be much less effective for their intended purpose when thus submerged, they will, nevertheless, produce substantial turning moments which will assist in turning the craft when the track-laying mechanisms are manipulated by the levers 27 and 28 to cause these to travel at differential speeds.

While I have shown an electrical mechanism as preferable for controlling the deflectors 55 and 56 of my invention, these may be controlled from the levers 27 and 28 by any suitable means, such for instance, as a cable system 95 shown diagrammatically in Fig. 2. In this system, cables 96 and 97, passing around pulleys 98, connect the levers 27 and 28 with the arm 67 so that even a slight movement of either of the levers 27 or 28 will cause the deflectors 55 and 56 to correspondingly turn about their pintles 57.

In this manner the amphibian may be turned very slightly to keep it on a true course without slowing up either of the belts 15 or 16. This will permit the amphibian to travel at top speed over a given stretch of water while permitting the pilot to steer it and keep it on its course, or even to change its course gradually if this is desirable. When using the cable system 95, therefore, the levers 27 and 28, when moved slightly, will accomplish the steering of the amphibian by use of the deflectors 55 and 56 alone, while moving one of the levers 27 or 28 a greater distance will accomplish turning the amphibian on a much shorter radius by substantially decreasing the propulsive effect of one of the belts 15 or 16 and increasing that of the other while presenting a deflector blade at a steep angle to the stream of water 38 produced by the accelerated traction belt.

I claim:

1. In a dirigible water craft, the combination of: a hull; propulsion means provided on said hull, said means in its operation discharging a stream of water rearwardly through the air above the surface of the water sustaining said craft; a deflector mounted on said hull to be disposed continuously in said stream; and control means for turning said deflector in said stream to assist in steering said craft.

2. In a dirigible water craft, the combination of: a hull; propulsion means provided on opposite sides of said hull, said means in their operation discharging water rearwardly along spaced paths; deflectors mounted to be continuously positioned in said paths; means for driving said propulsion means at the same or different speeds; and means linked cooperatively with said driving means and operating automatically, when one of said propulsion means is driven faster than the other, for turning said deflectors to assist in causing said craft to turn in a direction away from said faster moving propulsion means.

3. In a dirigible water craft, the combination of: a hull; propulsion means provided on opposite sides of said hull, said means in their operation discharging streams of water rearwardly through the air above the surface of the water sustaining said craft; a pair of deflectors mounted on said hull, each of said streams having one of said deflectors disposed continuously therein; and means for turning said deflectors simultaneously and in the same direction, to produce a reaction of said streams against said deflectors to assist in turning said craft either towards the right or the left.

4. In a dirigible water craft, the combination of: a hull; propulsion means provided on opposite sides of said hull, said means in their operation discharging streams of water rearwardly through the air above the surface of the water sustaining said craft; a pair of deflectors mounted on said hull, each of said streams having one of said deflectors disposed continuously therein; means for turning said deflectors simultaneously and in the same direction, to produce a reaction of said streams against said deflectors to assist in turning said craft either towards the right or the left; means for driving said propulsion means at equal or different speeds; and means responsive to the driving of said propulsion means at different speeds to turn said deflectors to assist in turning said craft in a direction away from the faster driven propulsion means.

5. In a dirigible water craft, the combination of: a hull; right and left-hand propulsion means provided on opposite sides of said hull, said means in their operation discharging water rearwardly along spaced paths; deflector means for intercepting said water discharged along said paths to assist in steering said craft; means for driving said propulsion means at the same or different speeds; and a single control means operable in a given manner to dispose said deflector means to effect the steering of said craft while both of said propulsion means are being driven at substantially the same speed, and operable in a different manner to not only dispose said deflector means to produce a turning moment in a given direction, but to cause the driving of said propulsion means at different speeds, the propulsion means on the outside of said turn being driven at the faster rate.

6. A combination as in claim 5 in which means is provided for automatically locking said deflector means in neutral when said control means are not being actuated to assist in the steering of said craft.

JAMES M. HAIT.